US010550564B1

(12) United States Patent
McKinney

(10) Patent No.: US 10,550,564 B1
(45) Date of Patent: Feb. 4, 2020

(54) SYSTEM FOR FLUSHING A CONDUIT

(71) Applicant: Jerry L. McKinney, Silsbee, TX (US)

(72) Inventor: Jerry L. McKinney, Silsbee, TX (US)

( * ) Notice: Subject to any disclaimer, the term of this patent is extended or adjusted under 35 U.S.C. 154(b) by 0 days.

(21) Appl. No.: 15/694,351

(22) Filed: Sep. 1, 2017

Related U.S. Application Data

(60) Provisional application No. 62/384,587, filed on Sep. 7, 2016.

(51) Int. Cl.
*E03F 9/00* (2006.01)
*C02F 3/28* (2006.01)
*A01G 25/00* (2006.01)
*A01G 25/16* (2006.01)

(52) U.S. Cl.
CPC .............. *E03F 9/007* (2013.01); *A01G 25/00* (2013.01); *C02F 3/2866* (2013.01); *A01G 25/162* (2013.01); *Y10T 137/7808* (2015.04)

(58) Field of Classification Search
CPC ....... Y10T 137/7808; Y10T 137/86501; Y10T 137/86509; Y10T 137/86517; E03F 9/007; Y02W 10/15; A01G 25/162
See application file for complete search history.

(56) References Cited

U.S. PATENT DOCUMENTS

| 343,125 A | 6/1886 | Hazlet et al. |
| 614,441 A | 11/1898 | Burnett |
| 2,219,408 A | 10/1940 | Benz et al. |
| 2,888,949 A | 6/1959 | Evans |
| 3,053,641 A | 9/1962 | Nagy et al. |
| 3,407,841 A | 10/1968 | Semon |
| 3,890,999 A | 6/1975 | Moskow |
| 3,930,519 A | 1/1976 | Byrd |
| 4,125,124 A | 11/1978 | Kah |
| 4,281,681 A | 8/1981 | Teague, Jr. et al. |
| 4,543,985 A | 10/1985 | Healy et al. |
| 5,200,065 A * | 4/1993 | Sinclair .................. C02F 1/006 210/104 |
| 5,445,182 A | 8/1995 | Sturman et al. |
| 5,649,562 A | 7/1997 | Sturman et al. |
| 5,670,038 A * | 9/1997 | McKinney ......... B01D 17/0214 210/106 |
| 6,047,949 A | 4/2000 | Beauchemin, Jr. |
| 6,257,264 B1 | 7/2001 | Sturman et al. |
| 7,735,509 B2 * | 6/2010 | Galloway ........... F16K 37/0091 137/119.03 |
| 8,187,472 B1 * | 5/2012 | Svetlik, III ............. C02F 3/288 210/108 |

(Continued)

*Primary Examiner* — Reinaldo Sanchez-Medina
*Assistant Examiner* — Hailey K. Do
(74) *Attorney, Agent, or Firm* — Bushman Werner, P.C.

(57) ABSTRACT

A system for flushing a conduit having an inlet, an outlet, and at least one flow restricted outlet between said inlet and said outlet. There is a pump operative to periodically be turned on and off for pumping a liquid from a liquid source to the inlet, a pressure pulse being generated when the pump is turned on. A hydraulically actuated indexing valve has an inlet connected to the second outlet end of the conduit, the indexing valve including a valve element assembly indexable between a plurality of indexed positions in response to a plurality of pressure pulses, wherein in at least one of the indexed positions, return flow from the second outlet end of the conduit flows through the outlet of the valve to increase flow rate through the conduit.

19 Claims, 6 Drawing Sheets

(56) References Cited

U.S. PATENT DOCUMENTS

| | | |
|---|---|---|
| 8,245,720 B2 | 8/2012 | Grill et al. |
| 8,715,492 B2 | 5/2014 | McKinney |
| 2005/0274657 A1 | 12/2005 | McKinney |
| 2008/0237106 A1* | 10/2008 | Jessick .................... C02F 1/006 210/170.08 |
| 2012/0024766 A1* | 2/2012 | McKinney .............. E03B 1/041 210/85 |

* cited by examiner

SYSTEM FOR FLUSHING A CONDUIT

CROSS REFERENCE TO RELATED APPLICATION

This application claims priority to U.S. Application No. 62/384,587 filed on Sep. 7, 2016, the disclosure of which is incorporated herein by reference for all purposes.

FIELD OF THE INVENTION

The present invention to the flushing of a conduit and, in particular, to a conduit having a flow restricted outlet. More particularly, the present invention relates to a system for flushing conduit forming an irrigation system to distribute wastewater from a septic system.

BACKGROUND OF THE INVENTION

Typically the treated water from a septic system, e.g., an aerobic wastewater treatment system (AWTS) is pumped from a holding vessel, e.g., a pump tank, to a drip or spray irrigation field. In a drip field, there is an array of lines, generally buried, each of which has a plurality of drip emitters which have small orifices which discharge small amounts of water from the lines into the drip field when the pump is in operation. A typical layout of a drip irrigation system connected to an AWTS is shown and described in U.S. Pat. No. 8,715,492, incorporated herein by reference for all purposes.

The drip emitters used in typical drip irrigation systems generally fall into two classes: pressure compensating (PC) emitters and non-pressure compensating (NPC) emitters. This designation of emitters is somewhat misleading since all emitters are pressure compensating to some degree. However, for purposes of defining the differences, PC emitters are those that are designed to discharge water at a uniform rate over a wide range of water pressures. By example, PC emitters give essentially the same flow at 3.0 bar (45 psi) as they do at 1.0 bar (15 psi). NPC emitters are dependent to a certain extent upon line pressure. However, provided line pressure is adequate, generally speaking, NPC emitters and PC emitters both operate satisfactorily to deliver substantially constant flow.

Regardless of the types of drip emitters used in a typical drip irrigation system, as noted above, they all have small orifices which can become plugged. It will be recognized that when the pump is operating to force water through the drip emitters, the flow rate through the lines or conduits is relatively low because of flow through the emitters, back pressure regulators, etc.

This low flow rate through the lines can lead to the accumulation of wastewater sludge, dirt, debris, and the like in the lines which can in certain instances plug the emitters and interferes with the operation of the irrigation system. Accordingly, many jurisdictions require that the lines in the drip field be periodically flushed at a high flow rate relative to the normal flow rate used when in the irrigation mode.

SUMMARY OF THE INVENTION

In one aspect, the present invention relates to a system for flushing a conduit with a liquid, the conduit having at least one flow restricted outlet between the conduit inlet end and the conduit outlet end.

In another aspect, the present invention relates to a system for flushing a conduit in an irrigation system connected to a septic system, e.g., an AWTS.

In a further aspect, the present invention relates to a system for periodically flushing lines/conduits in an irrigation system which requires no electrical connectivity.

In still another aspect, the present invention relates to a system for flushing the lines in an irrigation system which is hydraulically operated.

These and further features and advantages of the present invention will become apparent from the following detailed description, wherein reference is made to the figures in the accompanying drawings.

DETAILED DESCRIPTION OF PREFERRED EMBODIMENTS

Figure 1:
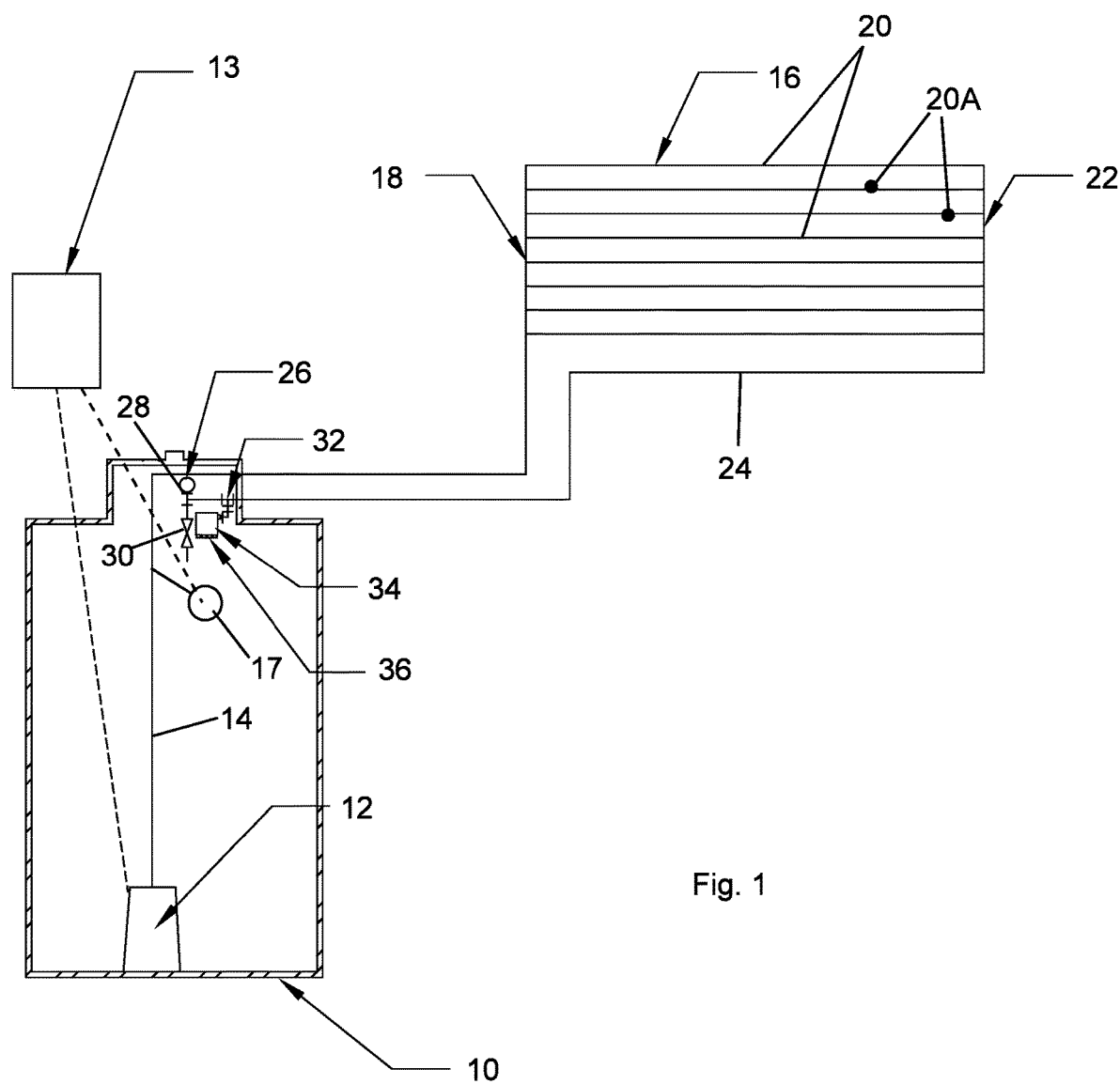
FIG. 1 is a schematic view of one embodiment of the line flushing system of the present invention.

The term "flow restricted outlet" (FRO), "restricted outlet" (RO), or similar terms as used in conjunction with a conduit having a first inlet end and a second outlet end is intended to describe an orifice, aperture or the like through which a desired amount of flow can occur when the liquid in the conduit is under sufficient pressure. Thus, a flow restricted outlet in accordance with the present invention can include a PC emitter, a NPC emitter, or even a small aperture or orifice in the conduit between the inlet and outlet ends.

The term "conduit" as used herein with respect to a drip irrigation field is intended to mean one or more lines, pipes, tubes or the like for conveying water. Thus, conduit includes a single pipe or the like having a first inlet end and a second outlet end, an array of lines, pipes, or the like, having opposite ends connected to headers or footers respectively, the headers being forming an inlet to the conduits, the footers forming an outlet from the conduits, both of which can be connected to other pipes, tubes or the like to supply water to the array of lines through the header or convey water from the lines to a second pipe conduit or the like from the footer. It will be understood that in both instances, the headers and footers act as manifolds.

In general, the system of the present invention can be used to flush at least one liquid conduit having a first inlet end and a second outlet end and in which there is a flow restricted outlet (FRO) in the conduit between the inlet end and the outlet end.

Thus, while the present invention will be described with particular reference to the distribution of wastewater from a conventional pump or holding tank as forming part of an AWTS, it will be understood it is not so limited. Thus, the system of the present invention can be used with any septic or wastewater treatment system which is interconnected to a drip or drain field, spray irrigation system or the like (collectively called Irrigation System) wherein the Irrigation System involves one or more lines or conduits having at least one, and preferably, a plurality of FRO's, e.g., drip emitters, spray heads, orifices, or the like by which the wastewater can be distributed to a desired area.

While the invention will be particularly described with respect to drip irrigation, as noted above, it is not so limited and can be used in any irrigation or liquid distribution system wherein a liquid, e.g., water from a wastewater treatment facility, is to be dispensed or distributed by means of pressurized lines which have FRO's, e.g., drip emitters, spray heads, orifices, or the like.

The term "indexing" or "sequencing" as used herein with respect to the valve used in the system of the present invention refers to an operation of a valve, whatever its type, wherein successive fluid pressure pulses to the valves cause the valve to alter its operation such that after a predetermined number of pulses in a given cycle, the valve allows free flow therethrough, the operation being repeated in subsequent cycles.

A typical indexing valve as used herein has an inlet and multiple outlets. Each time the pump turns on, there is a pressure pulse to the indexing valve. This pulse causes the valve element to change the direction of water flow from one outlet to another. Water will come first to outlet 1, then with the pressure off an internal wheel turns and when the pressure comes back on, the water will go to outlet 2. This will continue in a cycle of up to six outlets. However, regardless of the number of outlets, e.g., 4, 6, etc., the outlets can be capped or plugged off such that in only one position of the valve element will water flow freely through uncapped outlet of the valve.

Referring then to FIG. 1, there is shown a pump tank 10 in which is disposed a submersible pump 12 having a pump outlet line 14 which in turn is connected to the influent header/manifold 18 of an Irrigation System shown generally as 16. Pump 12 is operatively connected to a pump controller 13, discussed more fully hereafter. Influent header/manifold 18 is connected to an array of conduits 20 typically buried in the ground. Each of the conduits 20 has a plurality of NPC emitters 20A (only two of which are depicted schematically). Irrigation System 16 also includes an effluent footer/manifold 22 which in turn is connected to a return line 24. In the embodiment of FIG. 1, return line 24 is connected to back pressure regulator 26 which in the embodiment shown is comprised of a throttling valve 30 and optionally a pressure gauge 28. There is a T-fitting 32 connected in return line 24 between header 22 and back pressure regulator 26. The other leg of T-fitting 32 is connected to the inlet of an indexing or sequencing valve 34, described above and hereafter, the valve 34 having at least one outlet 36.

There is a pump controller 13 which in response to preselected event(s) acts to turn pump 12 on and off. For example, with reference to FIG. 1 pump 12 can be connected to a level sensor, e.g., float 17 or the like, disposed in tank 10 such that when the water level in tank 10 reaches a certain level, float 17 operatively connected to controller 13, signals controller 13 to activate pump 12 to discharge water to outlet line 14. Suitable level sensors are described in US Patent Publication 2005/0274657, incorporated herein by reference for all purposes. Further, the level sensor can be directly connected to the pump 12 to turn the pump on and off in response to the level of water in tank 10. Controller 13 of the present invention can also comprise a timer which can be programmed to turn the pump 12 on for selected periods of time sufficient to flush conduits 20. Other types of pump controllers which can be programmed and are used in wastewater treatment systems are well known to those skilled in the art.

When a float valve switch system is used to activate the pump, it is desirable, albeit not necessary, to regulate the return flow to the pump tank to ensure that at some point the float moves upwardly in response to a filling of the pump tank, thereby shutting the pump off. It will also be understood that the outlet from the indexing valve could be sent to another wastewater use recipient rather than being returned to the pump tank which would ensure that the float would ultimately return to a position wherein the pump is turned off in response to the inflow of wastewater from the AWTS or other septic system.

When pump 12 is on, the conduits 20 in irrigation system 16 are generally under sufficient pressure, e.g., 10-25 psi, depending on the size of the field, thus water flows through NPC restricted flow outlets formed by the NPC emitters into the drain or irrigation field. It will also be appreciated that during the irrigation cycle, i.e., when the pump is on and water is passing through the NPC Emitters, because of back pressure regulator 26, flow rate through conduits 20 will be at a relatively low rate, e.g., from about 1 to about 3 ft/sec.

Via a T-fitting 32, both the inlet of the back pressure regulator 26 and sequencing or indexing valve 34 are in open communication with return line 24. Thus when pump 12 is running, return water can flow through the uncapped or open outlet of valve 34.

As noted, valve 34 can be a sequencing/indexing valve. Such valves, which are hydraulically operated, require no electrical connection and are widely known to those skilled in the art. Non-limiting examples of such valves are disclosed and claimed in U.S. Pat. No. 4,125,124 ('124 Patent) and patents referenced therein, all of which are incorporated herein by reference for all purposes. Basically, as disclosed in the '124 Patent, a sequencing valve selectively directs a source of fluid through one or more of a plurality of use outlets. Many sequencing/indexing valves employ cam mechanisms or the like to selectively direct the incoming fluid to the particular use outlet(s). Other suitable valves requiring no direct electrical connectivity include mechanically programmable valves triggered by water pressure to advance the valve cycle, as described in U.S. Pat. No. 6,047,949, incorporated herein by reference for all purposes, and toggle valves such as those described in U.S. Pat. Nos. 5,445,182; 5,649,562; 6,257,264; and 8,245,720, all of which are incorporated herein by reference for all purposes.

As noted, a characteristic of the indexing valves employed in the present invention is that they are hydraulically actuated, i.e. they require no electrical connectivity. Further, they can be configured to allow water to pass freely therethrough after a desired number of sequential water pulses, or they can be, as in the case of a toggle valve, of a type which passes water through at a first water pulse and rejects flow therethrough in the second water pulse, the open/closed flow sequence being repeated with succeeding water pulses. Significantly, the system of the present invention eliminates the need for a solenoid valve which requires electrical connectivity.

By way of example only, a suitable valve for the present invention is a K-Rain series 4000 indexing valve marketed by K-Rain Manufacturing Corp. and which has an inlet and four outlets with three of the outlets can be plugged for use in the present invention. Accordingly, on every fourth water pulse, i.e., when the pump turns on, water from the return line of the drip field irrigation system would freely pass through the open outlet in valve into the tank 10. This of course, as noted above, would allow high flow rate through the lines in Irrigation System 16, effectively flushing them. In other words, on the cycle of the valve when the outlet is open and the pump on, water would flow, unobstructed, through the lines 20 and return to tank 10 rather than passing through the back pressure regulator 26.

In the embodiment described above, the pump 12 is shown as being disposed in the pump tank. It is to be understood that the pump could be external of the pump tank or similar holding tank. Further, while the return water from the drip irrigation field is being shown as returned to the pump tank, it is to be understood that it could be returned upstream of the pump or holding tank, e.g., to the trash tank of an AWTS.

Figure 2:
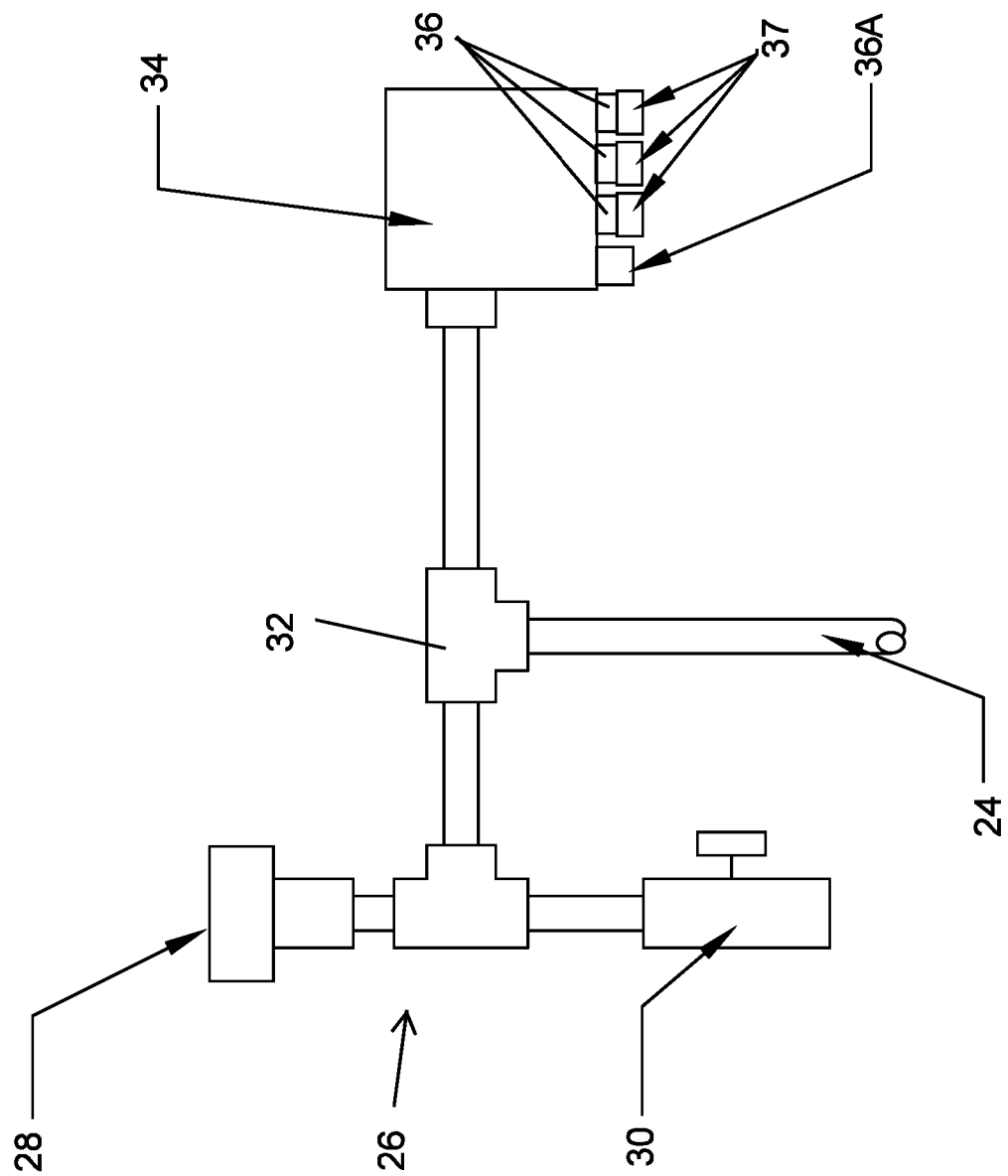
FIG. 2 is a detailed schematic view of one embodiment of the line flushing system of the present invention.

Referring next to FIG. 2 there is shown in greater detail the plumbing connections between the valve 34 and the back pressure regulator 26 in the return line 24 depicted in FIG. 1. In particular, the four outlets 36 from the valve 34 can be seen, three of the outlets 36 being plugged by caps 37, one of the outlets 36A being open to allow free flow from valve 34.

Figure 3:
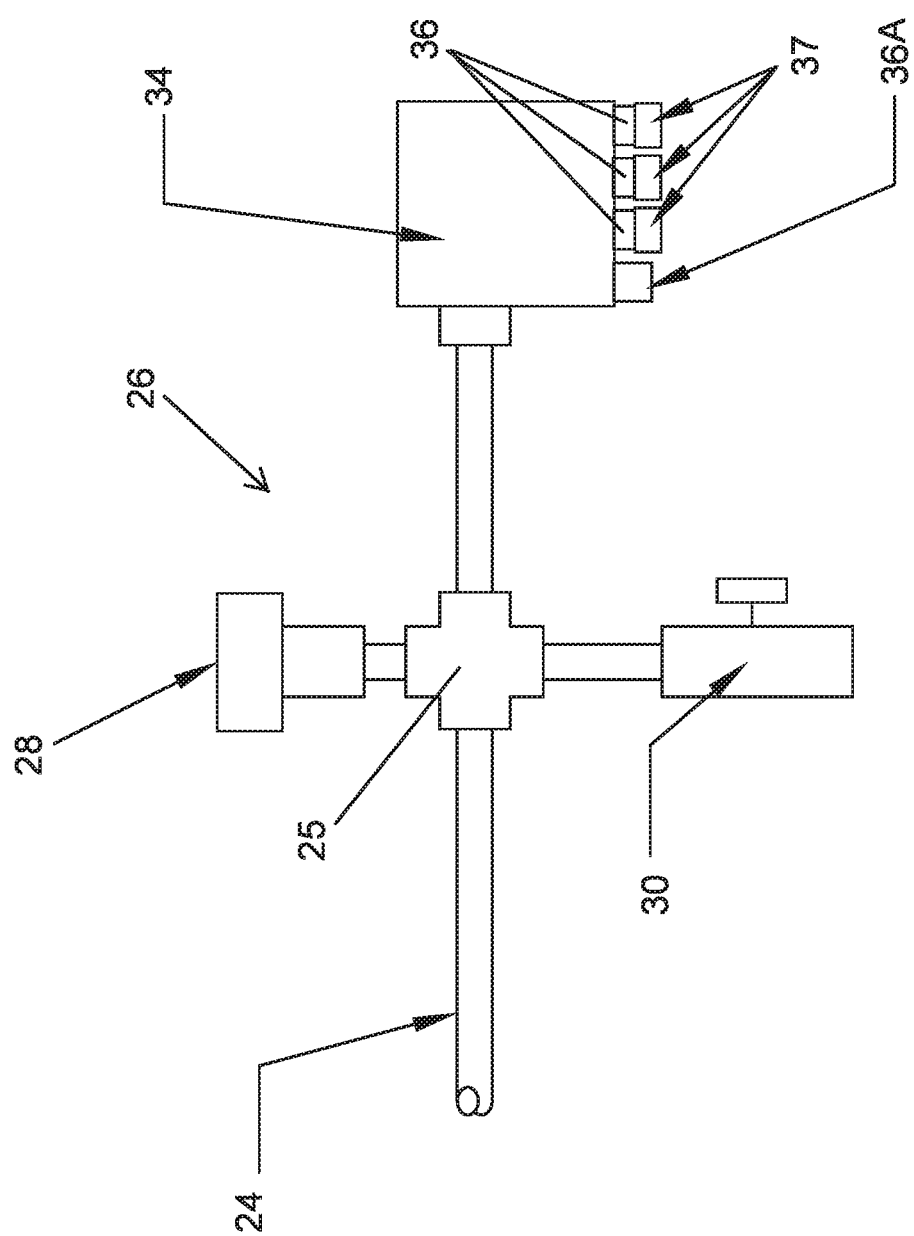
FIG. 3 is a detailed schematic view of another embodiment of the line flushing system of the present invention.

Referring now to FIG. 3, there is shown an enlarged schematic of a system which is functionally equivalent to the system shown in FIGS. 1 and 2 but which is plumbed in a slightly different manner. In this regard, return line 24 is connected to the inlet of cross-fitting 25, the outlets of which are connected to the back pressure regulator 26, the throttling valve 30, and valve 34.

Figure 4:
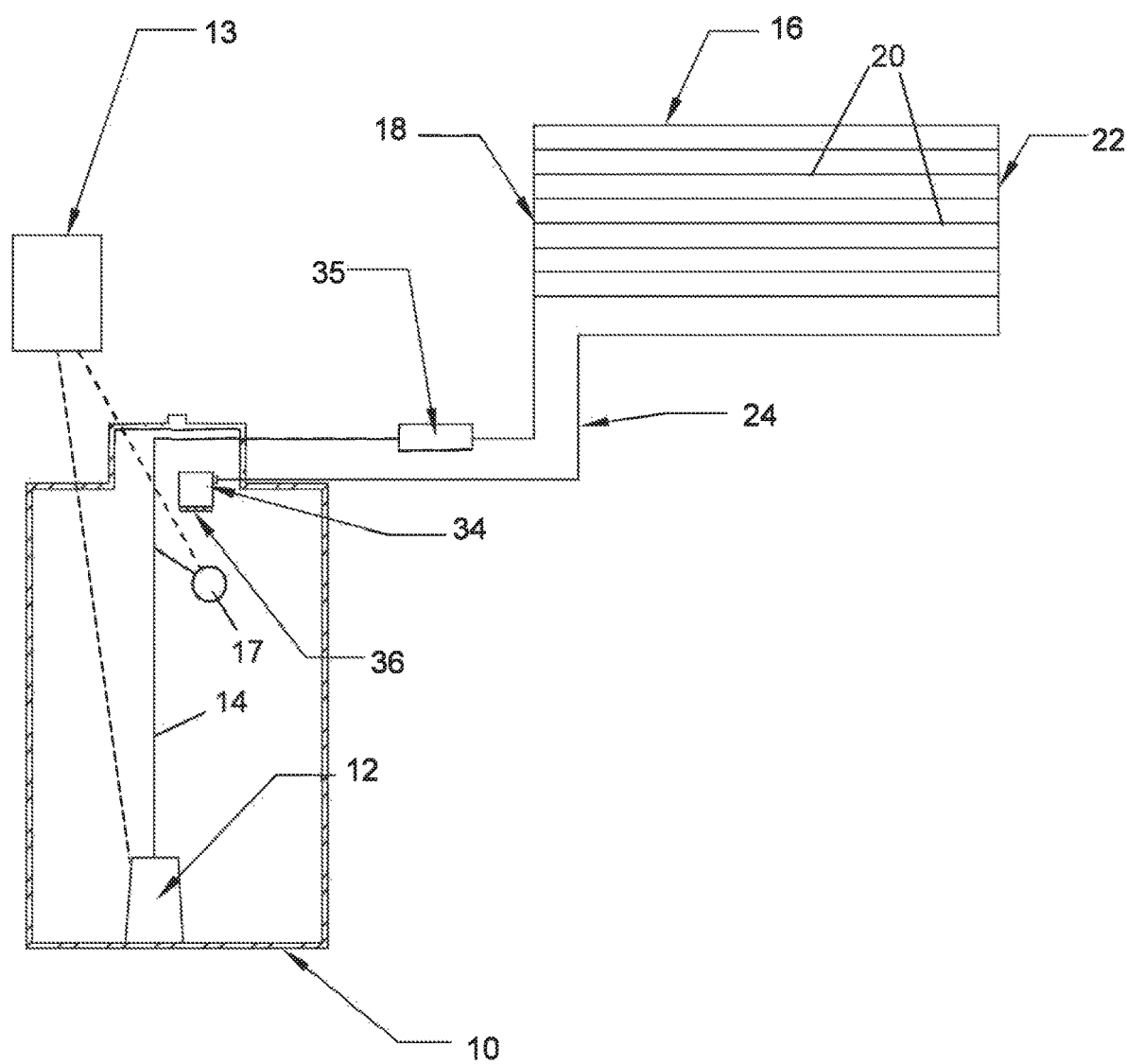
FIG. 4 is a view similar to FIG. 1 of another embodiment of the line flushing system of the present invention.

Referring now to FIG. 4, the embodiment shown therein is similar to embodiments shown in FIGS. 1-3 with the primary exception being that pressure in the Irrigation System, rather than being accomplished by back pressure regulation downstream from Irrigation System 16 is accomplished by pressure regulator 35 in line 18 between pump 12 and header 18, i.e., upstream from Irrigation System 16. However, in most other respects the embodiments of FIGS. 1 and 4 are the same, particularly in respect of the use of indexing or sequencing valve 34 as part of the flushing apparatus. Pressure regulator 35 is of the type which can be connected in a system upstream of the Irrigation System 16 to maintain a substantially constant pressure through the conduits and hence the emitters, spray heads, or the like. In short, pressure regulator 35 can limit excess inlet water pressure to provide a constant outlet pressure. It is known that most emitters of whichever type perform best at a specific pressure level which is often lower than the in-line pressure. However, it is also known that the in-line pressure in the conduit in which the emitter is placed should be at least 5 psi (0.34 bar) higher than the drip emitter's designed outlet pressure. Many of these types of pressure regulators rely on a spring biasing piston or other member in a passageway for opening or closing a portion of the passageway. Typical examples of so-called upstream pressure regulators are disclosed in U.S. Pat. Nos. 614,441; 2,219,408; 3,407,841; 343,125; 2,888,949; 3,930,519; 4,281,681; 3,890,999; 3,888,0233; 4,033,595; 3,837,463; 3,053,641; 4,543,985; and USSR 325596, all of which are incorporated herein by reference for all purposes. In particular, U.S. Pat. No. 4,543,985, discloses an upstream pressure regulator which is characterized by having a means for dampening oscillations in the throttling stem and thereby dampening variation in the pressure of the fluid passing through the pressure regulator. Non-limiting examples of commercially available upstream pressure regulators or reducers of the type described in U.S. Pat. No. 4,543,985 are marketed under the trademark Senniger™.

In operation, the apparatus shown in FIG. 4 functions substantially the same as that shown in FIG. 1 in that as succeeding water pulses are received at valve 34 due to the on/off operations of the pump 12, valve 34 indexes or sequences through successive positions in at least one of which the valve 34 allows free flow of the water through outlet 36 thereby allowing higher flow rate in Irrigation System 16 resulting in flushing of the lines 20.

Figure 5:
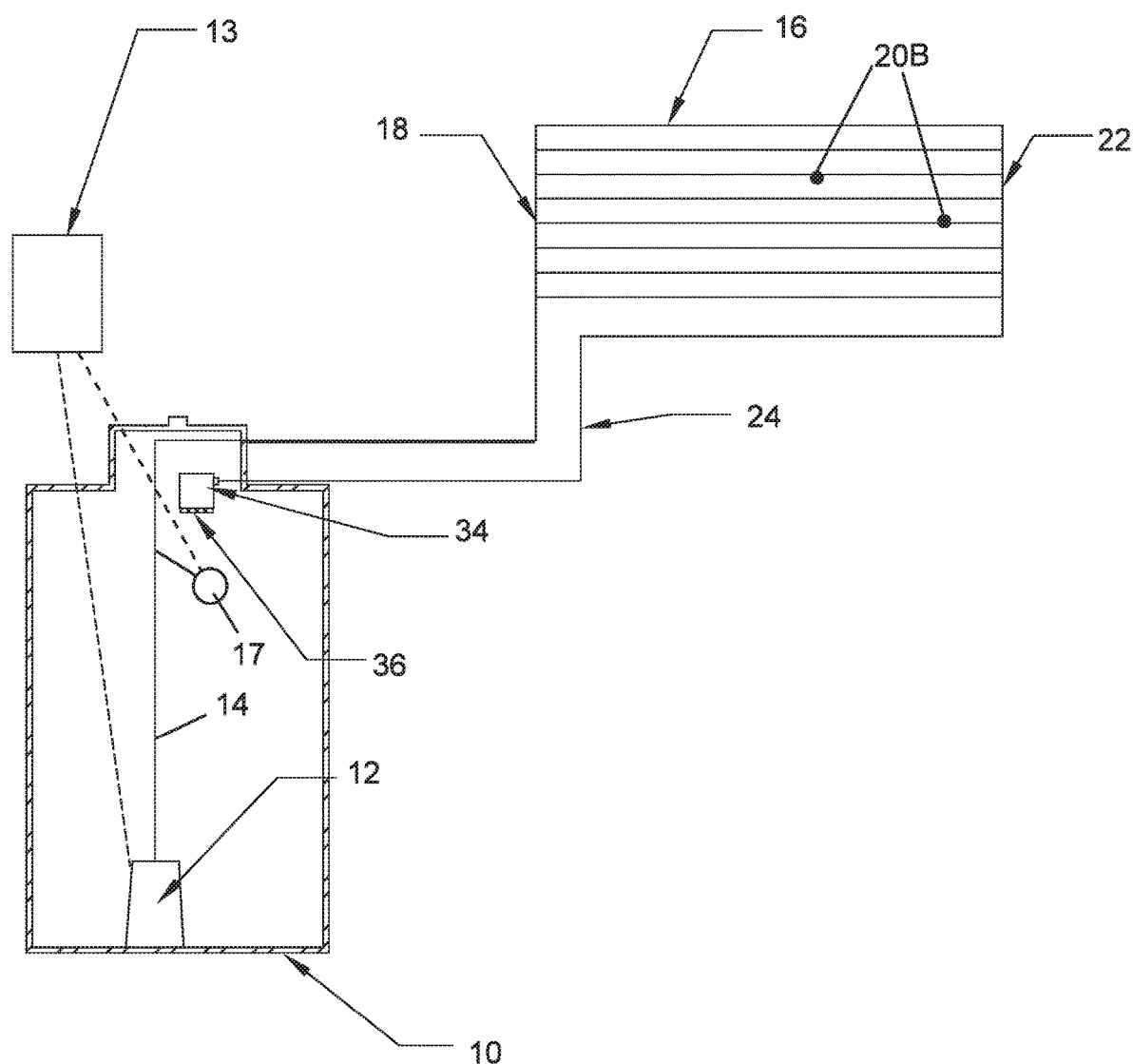
FIG. 5 is a view similar to FIG. 1 of another embodiment of the flushing system of the present invention.

Referring to FIG. 5, there is shown another embodiment of the present invention. The embodiment shown in FIG. 5 is virtually identical to the embodiment shown in FIG. 4 with the exception that the drip emitters 20B are PC emitters and there is no upstream pressure regulator 35. In effect, pressure regulation necessary to operate the PC emitters is incorporated into the PC emitters 20B per se. Generally speaking, outlet pressure of water from a pump used with a pump tank in a conventional wastewater system is from about 10 to about 75 psi. This results in sufficient pressure in the conduits in the drip field to ensure that the PC emitters 20B function effectively. In point of fact, should the inlet line pressure to manifold 18 be too high, then the pressure regulator 35 shown in FIG. 4 could be incorporated. In all other respects, the system of FIG. 5 operates in the manner described above in that indexing valve 34 is indexed through a predetermined number of positions before reaching the uncapped outlet 36A (not shown in FIG. 5), wherein increased flow rate through the lines 16 in the Irrigation Field will be increased to permit flushing of the lines. It will be recognized that in point of fact no pressure regulator of any kind may be necessary in the conduits assuming the pump pressure to the conduits is sufficient to operate the emitters. For example, if the conduit was short enough that there was no significant pressure drop throughout the length of the conduit, only the pump outlet pressure would be sufficient to operate the emitter.

Figure 6:
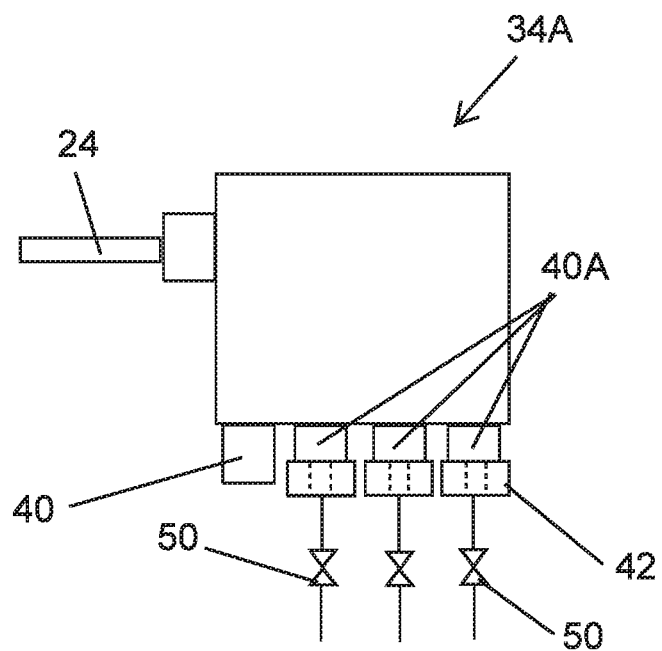
FIG. 6 is a schematic view of an indexing valve assembly for use in the system of the present invention.

Turning now to FIG. 6, there is shown an embodiment of an indexing valve assembly for use in the system of the present invention. Indexing valve 34A is, as in the case of the other embodiments, connected at its inlet to return line 24. Further, as in the case with the other embodiments of indexing valve discussed above, indexing valve 34A has an outlet 40 which is open such that when the valve mechanism in valve 34A indexes to that outlet, free flow through valve 34A is permitted. The other three outlets 40A of indexing valve 34A are provided with caps 42 which have apertures (shown in phantom) therethrough, the apertures receiving throttling valves 50. Throttling valves 50 serve to restrict flow through the capped outlets 40A and thereby effectively create back pressure in the conduits in the Irrigation System and effectively take the place of the back pressure system shown for example in FIG. 3. As can be seen in FIG. 6, the apertures (shown in phantom) in the caps 42 could, in and of themselves, serve as flow restrictors provided they were of a certain diameter to obtain the desired back pressure of approximately 15 psi in the conduits in the Irrigation System. Thus both the throttling valves 50 and the apertures per se form flow restrictors which act to create back pressure in the lines in the Irrigation System. It will be understood that for the most part, the indexing valve 34A would only be used when the emitters were NPC emitters. It will further be understood that if valve 34A is used, neither of the plumbing arrangements shown in FIG. 2 or 3 involving valve 30 and/or back pressure regulator 26 would be employed.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

What is claimed is:

1. A flushing system for flushing at least one conduit in a distribution system used to distribute a liquid from a liquid source, said distribution system including a conduit inlet connected to a conduit for introducing a liquid into said conduit, a conduit outlet connected to said conduit for receiving return liquid from said conduit, and at least one flow restricted outlet between said conduit outlet and said conduit inlet, said flushing system comprising:
   a pump adapted for pumping said liquid to said conduit inlet and through said conduit, said pump being operative to periodically turn on and off, wherein when said pump is turned on a pressure pulse is produced;
   a hydraulically actuated indexing valve having a valve inlet, a plurality of valve outlets, and a valve element assembly indexable between a plurality of indexed positions in response to a plurality of said pressure pulses, respectively, said hydraulically actuated indexing valve being connected to said conduit outlet, wherein in at least one of said plurality of indexed positions water from said conduit outlet flows through one of said plurality of valve outlets, thereby increasing flow rate through said conduit, at least one other of said plurality of valve outlets being connected to a flow restrictor to form a restricted valve outlet, wherein in at least one other of said plurality of indexed positions water from said conduit outlet flows into said restricted valve outlet whereby back pressure is created in said conduit.

2. The flushing system of claim 1, further comprising a back pressure regulator connected to said conduit outlet.

3. The flushing system of claim 1, further comprising a pressure regulator connected to said conduit inlet.

4. The flushing system of claim 1, wherein each of said plurality of valve outlets except one is connected to a respective flow restrictor to form a respective restricted valve outlet.

5. The flushing system of claim 1, wherein said flow restrictor comprises an aperture in a cap over said at least one other of said plurality of valve outlets.

6. The system of claim 1, wherein said flow restrictor comprises a throttling valve connected to said at least one other of said plurality of valve outlets.

7. The flushing system of claim 1, wherein said liquid comprises wastewater from a septic system.

8. The flushing system of claim 7, wherein said wastewater is contained in a pump tank.

9. The flushing system of claim 8, wherein said pump is disposed in said pump tank.

10. The flushing system of claim 1, further comprising a pump controller to turn said pump on and off.

11. The flushing system of claim 10, wherein said pump controller comprises a timer.

12. The flushing system of claim 10, wherein said pump controller comprises a level sensor.

13. The flushing system of claim 12 wherein said level sensor comprises a float member.

14. A flushing system for flushing a conduit used to distribute a liquid from a liquid source, said flushing system comprising:
   a conduit inlet connected to said conduit for introducing a liquid into said conduit, a conduit outlet connected to said conduit for receiving return liquid from said conduit, and at least one flow restricted outlet between said conduit outlet and said conduit inlet;
   a pump adapted for pumping said liquid to a conduit inlet and through a conduit, said pump being operative to periodically turn on and off, wherein when said pump is turned on a pressure pulse is produced;
   a hydraulically actuated indexing valve having a valve inlet, a plurality of valve outlets, and a valve element assembly indexable between a plurality of indexed positions in response to a plurality of said pressure pulses, respectively, said hydraulically actuated indexing valve being connected to said conduit outlet, wherein in at least one of said plurality of indexed positions water from said conduit outlet flows through one of said plurality of valve outlets, thereby increasing flow rate through said conduit, at least one other of said plurality of valve outlets being connected to a flow restrictor to form a restricted valve outlet, wherein in at least one other of said plurality of indexed positions water from said conduit outlet flows into said restricted valve outlet whereby back pressure is created in said conduit.

15. The flushing system of claim 14, wherein the flushing system comprises a plurality of conduits, said conduit inlet being connected to a header manifold, and said conduit outlet being connected to a footer manifold.

16. The flushing system of claim 15, wherein each of said plurality of conduits has a plurality of flow restricted outlets.

17. The flushing system of claim 16, wherein each of said plurality of flow restricted outlets comprise drip emitters.

18. The flushing system of claim 16, wherein each of said plurality of flow restricted outlets comprise pressure compensating drip emitters.

19. The flushing system of claim 16 wherein each of said plurality of flow restricted outlets comprise non-pressure compensating drip emitters.

* * * * *